(12) United States Patent
Smith et al.

(10) Patent No.: US 9,129,478 B2
(45) Date of Patent: Sep. 8, 2015

(54) ATTRIBUTING USER ACTION BASED ON BIOMETRIC IDENTITY

(71) Applicant: Microsoft Corporation, Redmond, WA (US)

(72) Inventors: Robert Smith, Seattle, WA (US); Li-Chen Miller, Kirkland, WA (US); Joseph Wyman, Seattle, WA (US); Jonathan Garcia, Duval, WA (US); Pat Halvorsen, Clyde Hill, WA (US); Jason Giles, Seattle, WA (US)

( * ) Notice: Subject to any disclaimer, the term of this patent is extended or adjusted under 35 U.S.C. 154(b) by 123 days.

(21) Appl. No.: 13/897,466

(22) Filed: May 20, 2013

(65) Prior Publication Data

US 2014/0342818 A1    Nov. 20, 2014

(51) Int. Cl.
 *A63F 13/04* (2006.01)
 *H04N 13/02* (2006.01)
 (Continued)

(52) U.S. Cl.
 CPC ............ *G07F 17/3241* (2013.01); *A63F 13/06* (2013.01); *A63F 13/212* (2014.09); *A63F 13/213* (2014.09); *A63F 13/215* (2014.09); *A63F 13/42* (2013.01); *A63F 13/424* (2014.09); *A63F 13/428* (2014.09); *A63F 13/843* (2013.01); *G06F 3/011* (2013.01);
 (Continued)

(58) Field of Classification Search
 CPC .................... A63F 2300/201; A63F 2300/308; A63F 2300/535; A63F 2300/1087; A63F 2300/5533; A63F 2300/5546; A63F 2300/5573; A63F 2300/6072; A63F 13/04; A63F 13/06; A63F 13/10; A63F 13/213; A63F 13/42; A63F 13/424; A63F 13/843; G06F 3/011; G06F 3/012; G06F 3/017; G06K 9/00208; G06K 9/00281; H04N 21/4751; H04N 21/4755
 See application file for complete search history.

(56) References Cited

U.S. PATENT DOCUMENTS

| 6,993,659 B2 | 1/2006 | Milgramm et al. |
| 8,275,995 B2 | 9/2012 | Jobmann |

(Continued)

FOREIGN PATENT DOCUMENTS

| WO | 2013048421 A1 | 4/2013 |
| WO | 2013182914 A2 | 12/2013 |

OTHER PUBLICATIONS

Pedraza, et al., "Privacy and Legal Requirements for Developing Biometric Identification Software in Context-Based Applications ", Retrieved at <<http://www.sersc.org/journals/IJBSBT/vol2_no1/2.pdf>>, International Journal of Bio-Science and Bio-Technology, vol. 1, No. 2, Mar. 2010, pp. 12.

(Continued)

*Primary Examiner* — Lawrence Galka
(74) *Attorney, Agent, or Firm* — Aaron Chatterjee; Leonard Smith; Micky Minhas

(57) ABSTRACT

Example apparatus and methods concern attributing user actions based on biometric identifications. One example method includes detecting an action intended to control an application associated with a shared launch surface. The method includes associating the action with a body located in a field of view of a biometric sensor associated with a shared launch surface. Data from the biometric sensor is used to determine a biometric identity for the body and then the action is attributed to a user as a function of the biometric identity. A context associated with the user is accessed and an operation associated with the action is selectively controlled based on the context.

20 Claims, 8 Drawing Sheets

(51) Int. Cl.
| | |
|---|---|
| A63F 13/00 | (2014.01) |
| G06F 3/00 | (2006.01) |
| G07F 17/32 | (2006.01) |
| G06F 3/01 | (2006.01) |
| H04N 21/475 | (2011.01) |
| A63F 13/42 | (2014.01) |
| A63F 13/843 | (2014.01) |
| G06F 3/12 | (2006.01) |
| A63F 13/20 | (2014.01) |
| G06F 21/32 | (2013.01) |
| G06K 9/00 | (2006.01) |
| A63F 13/428 | (2014.01) |
| A63F 13/213 | (2014.01) |
| A63F 13/212 | (2014.01) |
| A63F 13/215 | (2014.01) |
| A63F 13/424 | (2014.01) |
| G06F 3/16 | (2006.01) |

(52) U.S. Cl.
CPC .......... *G06F 3/017* (2013.01); *G06F 3/12* (2013.01); *G06F 21/32* (2013.01); *G06K 9/00335* (2013.01); *G07F 17/3206* (2013.01); *H04N 21/4751* (2013.01); *H04N 21/4755* (2013.01); *G06F 3/167* (2013.01); *G06F 2203/0381* (2013.01); *G06F 2221/2109* (2013.01)

(56) References Cited

U.S. PATENT DOCUMENTS

| | | | |
|---|---|---|---|
| 2008/0032787 A1* | 2/2008 | Low et al. | 463/29 |
| 2009/0089055 A1 | 4/2009 | Caspi et al. | |
| 2009/0138805 A1 | 5/2009 | Hildreth | |
| 2009/0215533 A1* | 8/2009 | Zalewski et al. | 463/32 |
| 2010/0007582 A1* | 1/2010 | Zalewski | 345/8 |
| 2010/0075749 A1* | 3/2010 | Seshadri | 463/29 |
| 2010/0194762 A1* | 8/2010 | Latta et al. | 345/473 |
| 2011/0279368 A1* | 11/2011 | Klein et al. | 345/158 |
| 2013/0113878 A1* | 5/2013 | Zalewski | 348/42 |
| 2013/0324244 A1* | 12/2013 | Mikhailov et al. | 463/31 |

OTHER PUBLICATIONS

Jain, et al., "Biometric Identification", Retrieved at <<http://www.andrew.cmu.edu/course/67-302/BionnetricsACM.pdf>>, In Communication of ACM, vol. 43, No. 2, Feb. 2000, pp. 9.

"Etronika NUI Banking", Retrieved at <<Http://www.etronika.lt/kinect_project/ETRONIKA_NUI_Banking.pdf>>, Retrieved Date: Mar. 26, 2013, pp. 6.

Saddik, et al., "A Novel Biometric System for Identification and Verification of Haptic Users", Retrieved at <<http://ieeexplore.ieee.org/stamp/stamp.jsp?tp=&arnumber=4200995>>, IEEE Transaction on Instrumentation and Measurement, vol. 56, Issue.3, Jun. 2007, pp. 12.

Leyvand, et al., "Kinect Identity: Technology and Experience", Retrieved at <<http://research.microsoft.com/en-us/um/people/jiansun/papers/ieeecomputer11_kinectidentity.pdf>>, In IEEE Computer Society, vol. 44, Issue.4, Apr. 2011, pp. 4.

Constantino, Fábio "Best Effort Identification", Retrieved at https://fenix.ist.utl.pt/downloadFile/395144694736, Retrieved Date: Apr. 1, 2013, pp. 9.

Musa, et al., "A Simple Model for Biometric Identification Technology Using Fingerprint Scanning", Retrieved at <<http://ieeexplore.ieee.org/stamp/stamp.jsp?tp=&arnumber=6197071>>, In Proceeding of IEEE SoutheastCon, Mar. 15, 2012, pp. 4.

"International Search Report & Written Opinion for PCT Patent Application No. PCT/US2014/038683", Mailed Date: Sep. 5, 2014, 8 pages.

"Second Written Opinion Issued in PCT Patent Application No. PCT/US2014/038683", Apr. 16, 2015, 7 Pages.

\* cited by examiner

ATTRIBUTING USER ACTION BASED ON BIOMETRIC IDENTITY

BACKGROUND

Conventionally, game systems attribute user actions based on a one-to-one mapping between a signed-in user and a controller. This may limit the ability of a gamer to interact with a game console simultaneously in a variety of ways, to switch controllers, to move about in a game space, and in other ways. This conventional attribution approach arose because game consoles typically had a concept of a controller and a concept of a user and the only way to connect the user to the controller was through a sign-in procedure. The console may have established and maintained a fixed, one-to-one relationship between a controller and a player. All actions performed from a controller were associated with the user who entered their information from that controller and the only actions the user could perform were those associated with the controller on which the user signed in. In this one-to-one user-to-controller configuration, one user was identified as controlling the console. This control was manifested at the system level by having system level actions (e.g., application launches) associated with the user who controlled the console.

Computer systems, including game systems, may allow multiple users to access, sign in, or otherwise interact with the system at the same time. For example, a single game console may have dedicated controllers and may have the ability to allow additional transient controllers to interact with the game. Thus, multiple players may simultaneously be able to sign into and interact with a multi-user game. Additionally, the game console may allow different players to have different games active at different times and even to come and go from a game. The traditional, fixed, one-to-one relationship between a user and a controller may limit the game experience. This limiting experience may extend to other non-gaming systems.

Different users may have different contexts. A user context may describe, for example, user attributes and user state. User attributes may include, for example, name, language preferences, login credentials for applications, login credentials for websites, saved content including documents or game saves, or other data. User state may include, for example, location, or other data. When there are multiple users signed into a system, there are multiple contexts available to the system. Conventionally, when a user launched an application, the context associated with the application may have controlled, at least in part, the operation of the application. For example, a first user context may have caused an application to produce an English language presentation for a male who is an intermediate level swordsman while a second user context may have caused an application to produce a French language presentation for a female who is an expert archer. The context may have controlled in-game attributes (e.g., point of view, character) but may also have controlled attributes of other applications launched from the launch surface. A launch surface refers to a interface with which a user may interact to launch an application. A launch surface may be, for example, a desktop, a start menu, a dashboard, or other interactive item from which applications or processes can be initiated (e.g., launched). Conventionally, given the one-to-one user-to-controller relationship and the single launch surface owner approach, it may have been difficult, if even possible at all, to change the user context associated with an action.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods detect actions intended to control an application. The application may have been launched from a shared launch surface. The shared launch surface may be provided by a game console, a computer, an operating system, or other device or system. Example apparatus and methods associate the action with a body located in a field of detection of a biometric sensor associated with the shared launch surface. For example, a game console may have an infrared (IR) system that produces a depth map for a game space, a visible light camera system that acquires images from the game space, a sound and voice recognition system for acquiring voice data, or haptic interfaces for capturing fine movements. Example apparatus and methods determine, using data provided by the biometric sensor(s), a biometric identity for the body and then attribute (e.g., associate, couple, map) the action to a user as a function of the biometric identity. Once the biometric identity is available, a context associated with the user can be accessed and the application or shared launch surface can be controlled or manipulated as a function of the action and the context. The context may include, for example, information that describes the user in general (e.g., user attributes) and dynamic information that describes the user at a particular point in time (e.g., user state).

Example apparatus may be configured with hardware including a processor and a biometric sensor(s). The example apparatus may include a memory configured to store information concerning ownership of a shared launch surface provided by the apparatus or an operating system running on the apparatus. The apparatus may include logics that are configured to attribute a user action as a function of a biometric identity determined by data provided by the biometric sensor. The apparatus may track bodies located in a field of detection (e.g., field of view) of the biometric sensor. The apparatus may also identify actions performed in the field of detection. An action can be mapped to a body, and a body can be mapped to a user through a biometric identity. Once the action and the biometric identification of a user are identified, the apparatus may selectively control an operation of the apparatus as a function of the biometric identification.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
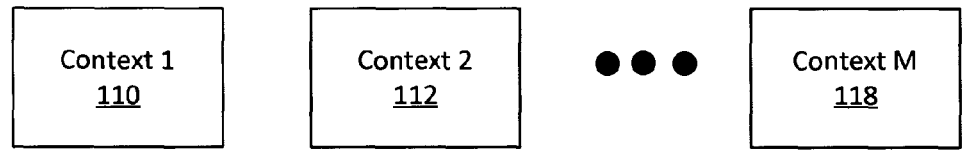
FIG. 1 illustrates an example game environment with example mappings.
Figure 1:
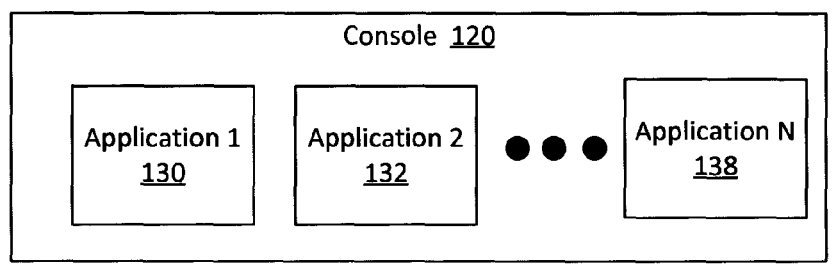
Figure 1:
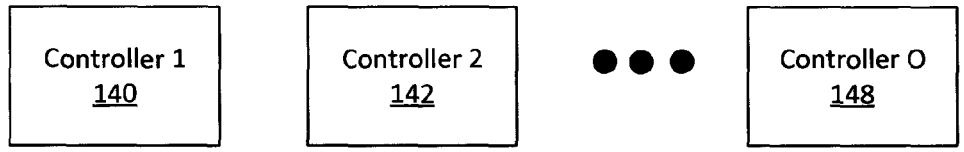
Figure 1:
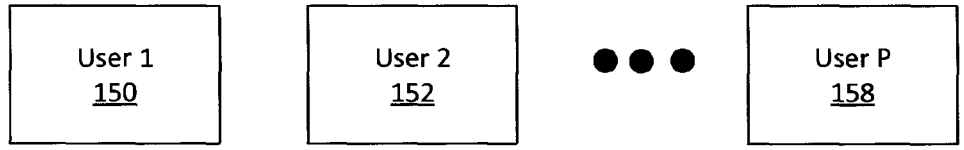

Example apparatus and methods decouple the fixed 1:1 relationship between a launch surface, a context, a user, and a controller. Rather than fix the user/controller relationship and the controller/context relationship, example apparatus and methods detect actions, detect and identify bodies, flexibly and dynamically determine an action/user relationship and a user/context relationship, and then associate the action with the appropriate context. Since users may employ different controllers at different times during a game session, identifying a user currently associated with a controller provides new flexibility. A controller may include, for example, a gamepad, a remote, a game guitar, a voice control apparatus, a gesture capture apparatus, haptic interfaces, natural user interfaces, or other apparatus. Additionally, since users may interact (e.g., initiate operations) with an application, launch surface, or system using different actions (e.g., button press, virtual button press, user interface interaction, voice command, gesture) at different times, identifying an action, and then identifying a user associated with the action, and then identifying a context to associate with the action, also provides new flexibility. The flexibility is extended even further by mapping the action to user to context at the time of the action.

Consider the following scenario: three gamers are signed in to a video game and are playing a collaborative search, reward, and story line game. A first user may have launched the game and may currently be in control of or otherwise associated with the launch surface. As the game progresses, one player leaves and another player joins, one player changes from a wired controller to a wireless controller, and another player changes from one wired controller to another wired controller. Conventionally, these controller changes may have caused the game to be halted or even exited so that the conventional one-to-one mappings could be brought up-to-date. Over time, a player other than the first player may acquire enough points to be eligible for a new game piece that may be available in an online auction. Conventionally, if the player wanted to launch the online auction application so they could acquire the item, the game would, once again, have to be suspended, perhaps even exited, while the player navigated to the launch surface, acquired the launch surface, and then launched the application. Once an item was acquired, the first user might then have to navigate back to the launch surface, re-acquire the launch surface, and re-launch the game. These are sub-optimal experiences for gamers. Similar sub-optimal experiences may be encountered by users of other non-gaming applications.

Conventionally, game systems have allowed multiple users but have had a fixed 1:1 relationship during a session between a controller and a player. This frustrates gamers because picking up the wrong controller, losing controller battery power during a game, or changing controllers during a game may produce undesirable results. For example, a gamer might have to end the game, reconfigure the game, and start over. Gamers really don't like doing this. Gamers want a more flexible experience, especially in games that may last a long time and where players can come and go during the game. Additionally, as more sophisticated wireless controllers become available, the ability to switch between controllers during a game may provide the gamer with a richer experience.

Example apparatus and methods break the fixed one-to-one relationship by making biometric identifications of users. Instead of using the biometrics for conventional actions (e.g., authentication, security), a biometric identity is used to map the person associated with an action to a context. As used herein, a biometric identity may include a fingerprint, a retinal pattern, or other unique physical attribute. A biometric identity may also include, for example, a user identified attribute (e.g., I am wearing the red shirt, I am wearing the white hat, I am the tallest person). A biometric identity may also include, for example, a system identified attribute (e.g., the tallest player, the roundest player, the player with the deepest voice, the player with the darkest colored shirt/hat, the player with the lightest hat/hair). Thus, biometric identity is intended to be used in a broad manner. Rather than performing a single biometric identification for security purposes, on-going real time or near real time biometric identifications may be made for bodies visible in the field of view of a game system for action attribution reasons. A gamer may move around during a game session. As the person moves around they might use different controllers or might initiate actions using different approaches. For example, at a first time a user might be on the left side of the game space and might use controller A to initiate an action (e.g., swing virtual golf club). At a second time, the user might be in the middle of the game space and might initiate an action (e.g., move to next hole) using a gesture (e.g., flick). At a third time, the user might be in the left of the game space and might initiate an action (e.g., check current stock prices) using a voice command. Example apparatus and methods may track the position of the user in real-time or near real-time and then match an action location to the user location to facilitate attributing the action.

Checking stock prices may require launching a separate application in, for example, a small popup that might be displayed just to the requester and that would not interrupt the game, at least for other players. The console may first detect the action and then identify the user associated with the action through biometrics. Example apparatus and methods may then consult, create, update or otherwise manipulate a current mapping to associate a context with the user that made the action. Once the context associated with the user has been identified, the action can be taken in light of the proper context. This can be done without navigating to the launch surface or reconfiguring the launch surface. This provides a seamless experience that facilitates an improved game experience.

Example apparatus and methods use the identity of the biometrically identified user and, in some cases, the location of the action, to map a context to an operation (e.g., launch application, manipulate application, use application), without disrupting the game in progress. For example, while the game is in progress the gamer might receive a text that a new video by their favorite artist is available. The gamer may want to download, acquire, or view the new video without having to exit the game. Conventionally, the user that initiated the game owns the launch surface and any application launched during the session will be associated with the launch surface owner. To switch the launch surface ownership to another person typically requires suspending/ending the game, which is unacceptable to many gamers. Conventionally, the gamer might not be able to simply pause the game, or even keep the game in progress, and launch a video acquisition application at the same time. With a flexible, dynamic biometric identity approach like that described herein, the gamer may make an application initiating action and acquire or view the video without ever leaving the game. Additionally, the video would be acquired by the user who initiated the action, not by the user who "owns" the launch surface. Thus, billing updates, data plan updates, or other user specific results would be associated with the gamer who actually accessed the video, not with the gamer who initially started the game. While games are described, other non-gaming applications may also use the flexible, dynamic, biometric identity based action attribution described herein.

Example apparatus and methods recognize that a multi-user system may have multiple users that may want to launch or otherwise interact with applications. Example apparatus and methods also recognize that users may have contexts that they want associated with an application or an action taken in an application. Thus, rather than tightly coupling a launch surface to a single user and to a single context that depends solely on a one-to-one relationship established between a user and a controller, example apparatus and methods may map users to contexts and contexts to actions with a flexible decoupled approach that attributes user actions based on biometric identities made at the time an action is taken.

Since users may come and go or may enter and leave a game space, example apparatus and methods may track bodies in the game space in real time or near real time, may biometrically identify a tracked body as a known user, and may associate a context with an action taken by that body based on the biometric identity. A biometric identity can be determined in different ways. Biometric identification may include, for example, facial recognition, voice recognition, fingerprint recognition, gesture recognition, haptic recognition, or other approaches.

FIG. 1 illustrates an example game environment with example mappings. A game console 120 may be able to run a number of applications (e.g., application1 130, application2 132, . . . applicationN 138). Console 120 may be able to support or interact with a number of controllers (e.g., controller1 140, controller2 142, . . . controllerO 148). Since console 120 is a multi-user system, console 120 may be able to support a number of users (e.g., user1 150, user2, 152, . . . userP 158). Since the console 120 may support multiple users, console 120 may have access to multiple contexts (e.g., context1 110, context2 112, . . . contextM 118). Conventionally, for any instance of any application, a specific controller would have a fixed one-to-one relationship with a specific user. The fixed one-to-one relationship would determine the context. Unfortunately, this fixed one-to-one relationship produced burdensome limitations for game play. For example, if user1 150 signed in with controller1 140, then user1 150 could only use controller1 140 for the duration of the game.

Example apparatus and methods break this fixed one-to-one relationship by tracking users during a game session and then mapping a user to an action at the time of the action. Thus, user1 150 might start playing a game while seated using controller1 140, then after a while user1 150 might put down controller1 140, move from the comfortable chair to a standing position and start interacting with the game using gestures rather than the controller. At a later time, user1 150 might lie down and start controlling the game using voice commands. Near the end of the game, user1 150 might pick up controller 148 and control the game with button presses from controller 148. This scenario would be impossible in traditional games.

However, by using mappings 160, example apparatus and methods may provide this level of flexibility. Mappings 160 show a four way mapping that relates a context to a controller and a user and an application. Different mappings may involve a greater or lesser number of attributes. In one embodiment, mappings 160 may be updated in real time or near real time to reflect the current reality in the game space.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
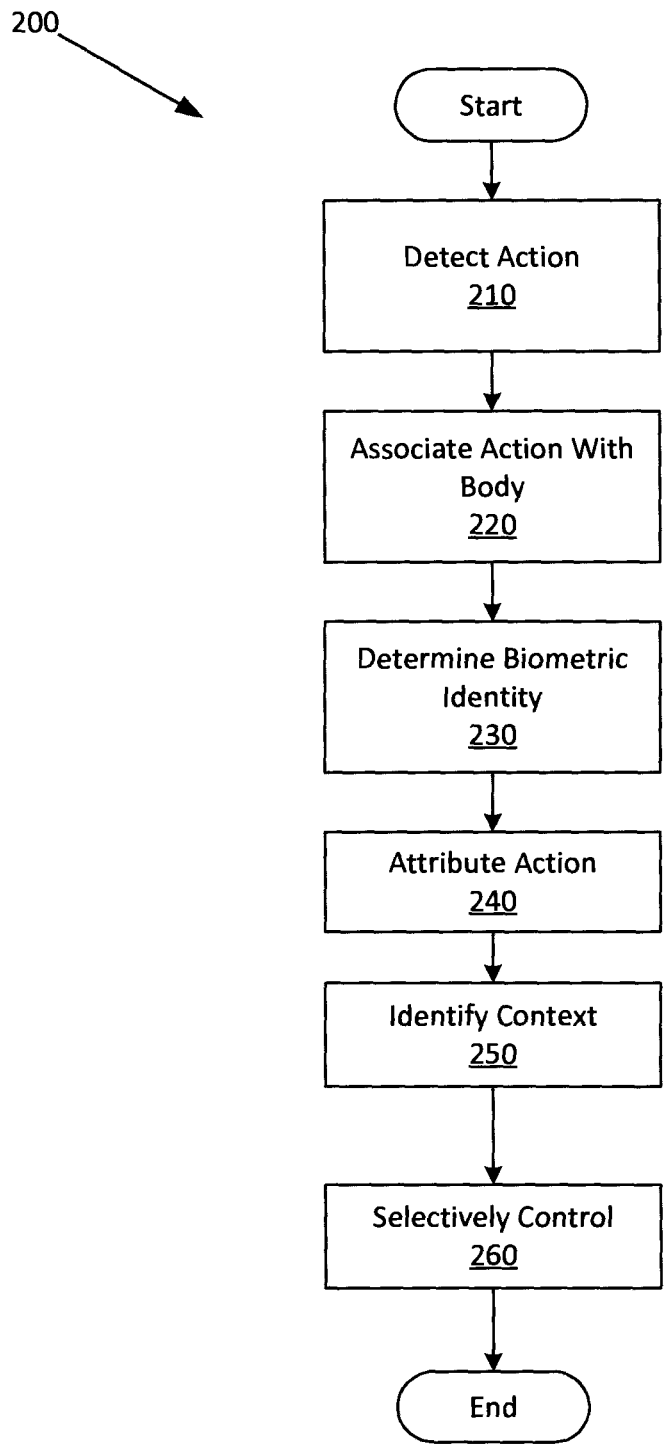
FIG. 2 illustrates an example method associated with attributing a user action based on a biometric identity.

FIG. 2 illustrates an example method 200 associated with attributing a user action based on a biometric identity. In different examples, method 200 may be performed on a single device, may be performed partially or completely in the cloud, may be performed on distributed co-operating devices, or may be performed other ways. In different examples, method 200 may be performed on devices including, but not limited to, a game console, a computer, a laptop computer, a tablet computer, a phone, and a smart phone.

Method 200 includes, at 210, detecting an action intended to control an application associated with a shared launch surface. In one embodiment, the application may be a video game and the shared launch surface may be associated with a video game console. While a video game and a video game console are described, other multi-user systems that employ a shared launch surface may be employed. For example, the shared launch surface may be associated with a multi-user operating system running on laptop computer, a tablet computer, or a phone.

In one example, detecting the action may include detecting actions including, but not limited to a button press, a virtual button press, an interaction with a user interface, an interaction with a game controller, a manipulation of a game controller, a voice command, or a gesture. The button press may occur on a game controller, on the console, or on another device configured to provide button press signals to the system or application. A virtual button press may be performed using a voice command, a gesture, or other action where a non-physical button is "pressed". An interaction with a user interface may include a physical interaction through, for example, a capacitive touch interface, a gesture interaction, or other interaction. A manipulation of a game controller may include, for example, pressing buttons on the controller, moving arrows on the controller, turning knobs or dials on the controller, accelerating the controller in a direction, holding the controller in an orientation, or other actions.

Method 200 also includes, at 220, associating the action with a body located in a field of view of a biometric sensor associated with a shared launch surface. In one example, the associating may be location based. For example, sounds from a location that is occupied by a body can be associated with that body. Similarly, controller actions from a location occupied by a body can be associated with the controller. When a gesture is made, the gesture may already be associated with a body that made the gesture.

Method 200 also includes, at 230, determining, using data provided by the biometric sensor, a biometric identity for the body. In one example, determining the biometric identity involves performing actions including, but not limited to, facial recognition, gesture recognition, voice recognition, fingerprint recognition, haptic recognition, or retinal recognition. The recognitions may be based on information received from a biometric sensor(s). For example, facial recognition may be performed from contours present in a depth map or visible features present in a visible light picture.

Method 200 also includes, at 240, attributing the action to a user as a function of the biometric identity. Attributing the action may include updating a mapping, updating a table that stores information relating actions to users, or otherwise associating an action and a user.

Method 200 also includes, at 250, identifying a context associated with the user. The context may include an attribute and a state. The attribute may describe data that is relatively unchanging for a user. The attribute may be, for example, a user name, a screen name, a data plan identifier, a billing identifier, an account identifier, a parental control setting, a display preference, or a social media data. Different contexts may include a greater or smaller number of attributes. The state may describe data that changes more frequently for a user. The state may be, for example, a location, a data plan balance, a billing balance, an account balance, an experience level, an access time, an engaged time, a location, or a connectivity level. Different contexts may include a greater or smaller number of state variables.

Method 200 also includes, at 260, selectively controlling the application or the shared launch surface as a function of the action and the context. In one example, the action may be intended to launch an application from the shared launch surface. In this example, selectively controlling the application or the shared launch surface may include launching the application from the shared launch surface using the context. In another example, the action may be intended to cause an operation in an application available through the shared launch surface. In this example, selectively controlling the application or the shared launch surface includes associating the context with the application and then causing the operation to occur in the application.

In one embodiment, selectively controlling the application or the shared launch surface may include launching a second application using the context while preserving a first context associated with a first application running on the shared launch surface. In this way, different applications may be associated with different contexts. For example, the game context may be associated with the person who launched the game while a stock checking popup may be associated with the person who wanted to check their stocks and a video application could be associated with the gamer who got the text and wanted to view the video immediately.

In one embodiment, selectively controlling the application or the shared launch surface may include selectively denying control of the application in response to the action based on the context or selectively denying launching an application based on the context. The denial may be based, for example, on a parental control, on a data plan limitation, or other information about the user.

Figure 3:
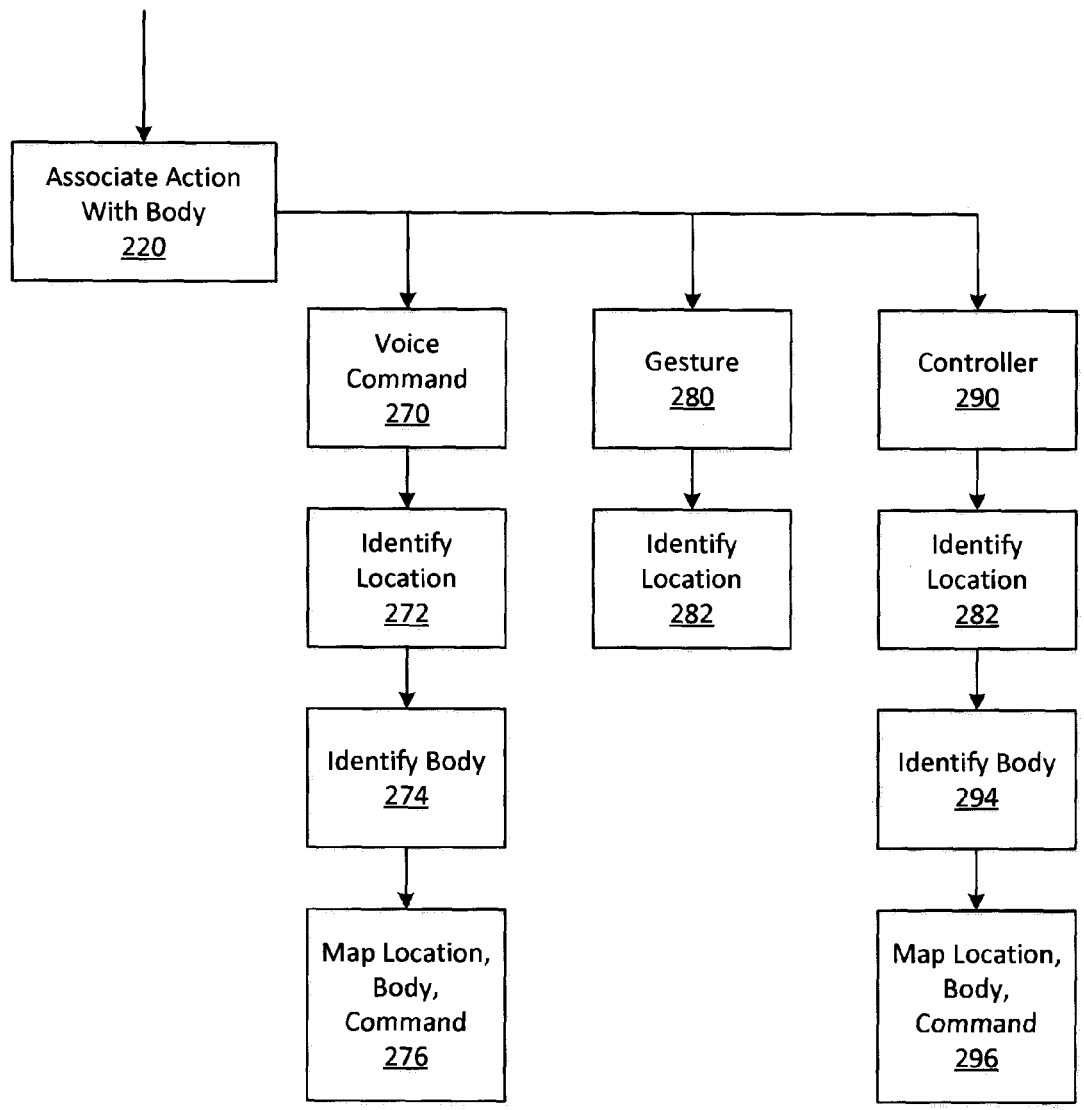
FIG. 3 illustrates a portion of an example method associated with attributing a user action based on a biometric identity.

FIG. 3 illustrates a portion of an example method associated with attributing a user action based on a biometric identity. One part of attributing the user action may include identifying the action as a voice command, identifying the action as a gesture, or identifying a controller associated with the action. If the action is identified as a voice command at 270, then processing may include, at 272, identifying a location from which the voice command originated. The location may be determined by a directional microphone(s), by triangulating the sound, or by other location methods. Processing may include, at 274, identifying a body corresponding to the location. The body may have been tracked by biometric sensors, IR sensors, visible light camera systems, or other apparatus in, for example, a game system. In one embodiment, the biometric identity is not being used to authenticate a user for security purposes (although it could), but rather is being used to identify who is currently at a location from which a voice command originated. Once the location of the voice and the location of the body have been identified, processing may include, at 276, mapping the body corresponding to the location to the voice command.

Attributing the user action may include identifying the action as a gesture at 280. If the action is identified as a gesture, then there will likely already be a body associated with the location at which the gesture was made, and processing may include, at 284, identifying the body that made the gesture.

Attributing the user action may include, at 290, identifying a game controller on which the action was performed. The game controller may be a wired controller, a wireless controller, a controller provided with the console, a controller provided by the gamer, or other controller. When a game controller is used, processing may include, at 292, identifying a location at which the game controller was located. Once the location has been identified, processing may include identifying a body corresponding to the location. The body may be identified using biometric identification. The biometrics are not being used to authenticate a user for security purposes, but rather are used to identify who is currently using a controller. Once the identification is made, processing may include, at 286, mapping the body corresponding to the location to the action.

While FIGS. 2 and 3 illustrates various actions occurring in serial, it is to be appreciated that various actions illustrated in FIGS. 2 and 3 could occur substantially in parallel. By way of illustration, a first process could detect actions, a second process could associate actions with bodies, a third process could produce a biometric identification of a body, and a fourth process could selectively control an operation as a function the action and a context associated with the biometric identification. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 200. While executable instructions associated with the above method are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, ROM, and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 4:
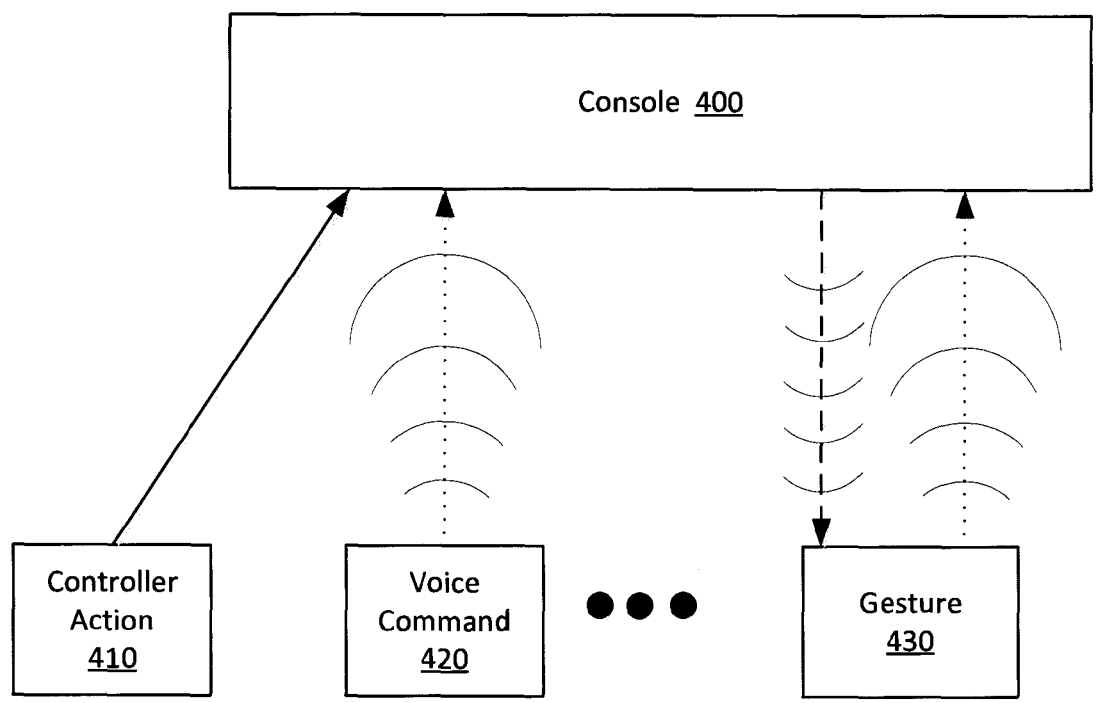
FIG. 4 illustrates an example game environment and different user actions.

FIG. 4 illustrates an example game environment and different user actions. A console 400 may detect actions including a controller action 410, a voice command 420, or a gesture 430. Detecting a controller action 410 may include receiving an electrical signal through a wire that connects a controller to console 410. Detecting the controller action 410 may also include receiving a data signal from a wireless controller through a wireless communication medium (e.g., radio frequency signal). Detecting the controller action 410 may not involve any biometric sensor.

Detecting a voice command 420 may include receiving sounds at a microphone(s). The microphone(s) may be directional. Voices may be distinguishable between users. Therefore, detecting a voice command 420 may involve a sensor(s) that is also used for a biometric identity. Like the controller action 410, detecting the voice command 420 may be a passive or unidirectional operation where signals flow from the device or person to the console 400.

Detecting a gesture 430 may involve an active operation that includes sending signals out into a game space and receiving reflected signals. Detecting a gesture may include identifying where the gesture occurred, what the gesture was (e.g., flick, pinch, spread, wave), the speed at which the gesture was performed, and other attributes of a gesture.

Figure 5:
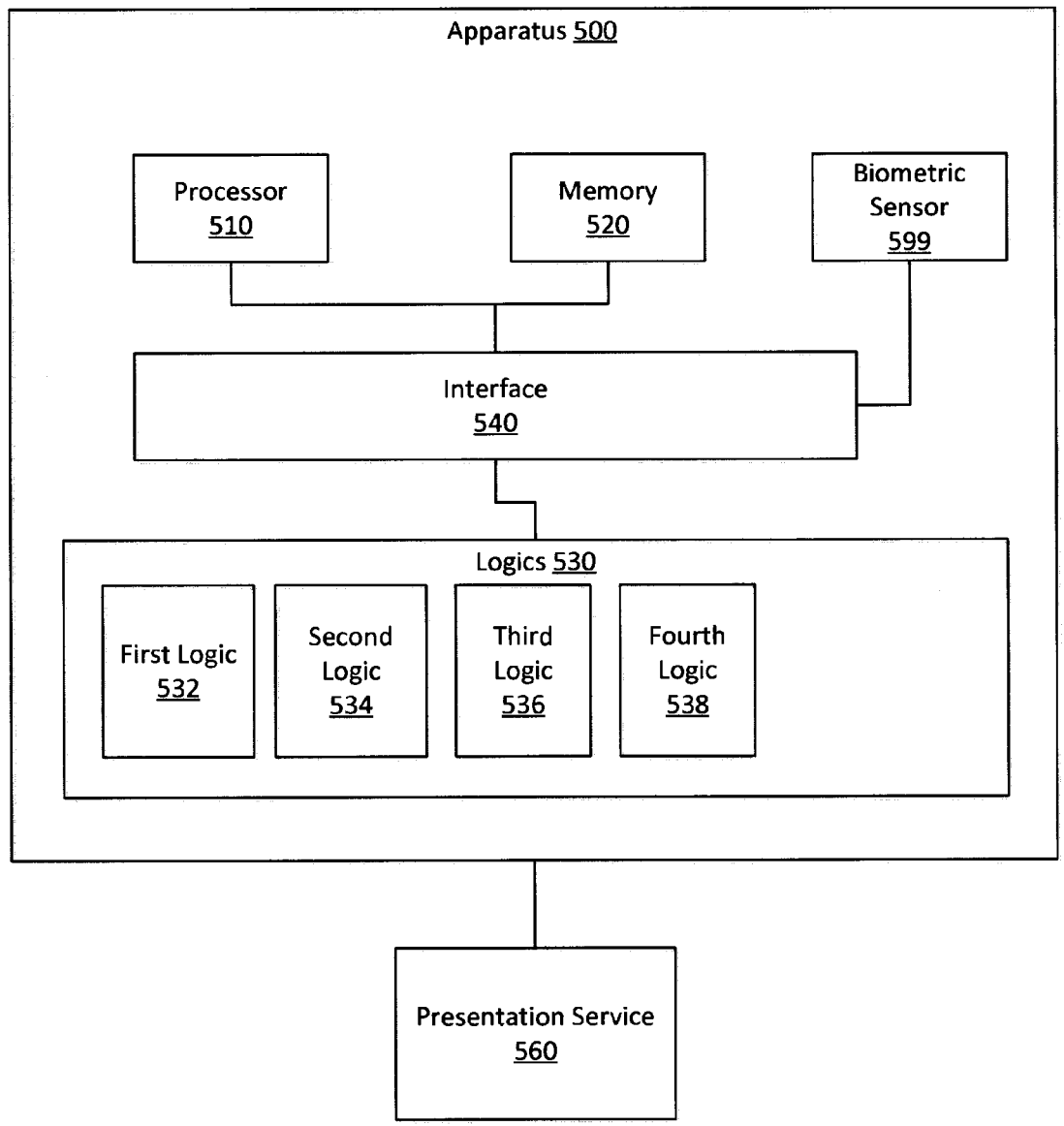
FIG. 5 illustrates an example apparatus configured to facilitate attributing a user action based on a biometric identity.

FIG. 5 illustrates an apparatus 500 that includes a processor 510, a memory 520, a set 530 of logics, a biometric sensor 599, and an interface 540 that connects the processor 510, the memory 520, the biometric sensor 599, and the set 530 of logics. The memory 520 may be configured to store information concerning ownership of a shared launch surface. The set 530 of logics may be configured to attribute a user action as a function of a biometric identity performed using data provided by the biometric sensor 599. Apparatus 500 may be, for example, a game console, a device acting as a game console, a computer, a laptop computer, a tablet computer, a personal electronic device, a smart phone, system-on-a-chip (SoC), or other device that can access and process data.

In one embodiment, the apparatus 500 may be a general purpose computer that has been transformed into a special purpose computer through the inclusion of the set 530 of logics. Apparatus 500 may interact with other apparatus, processes, and services through, for example, a computer network.

The set 530 of logics may include a first logic 532 that is configured to track one or more bodies located in a field of detection of the biometric sensor. In one embodiment, the first logic 532 may be configured to track the one or more bodies in real time using data provided by the biometric sensor 599. In this embodiment, the third logic 536 may be configured to maintain, in real time, a mapping between a member of the one or more bodies and a biometric identity.

The set 530 of logics may also include a second logic 534 that is configured to identify an action performed by a member of the one or more bodies. In different embodiments, the second logic 534 may be configured to identify a controller action, a voice command, a gesture, or other operation initiating action.

The set 530 of logics may also include a third logic 536 that is configured to produce a biometric identification of the member using data provided by the biometric sensor 599. The biometric sensor 599 may be, for example an infrared (IR) sensor, a vision system, a haptic system, a sound system, or a voice system. In one embodiment, the third logic 536 may be configured to acquire a set of user specific data associated with the biometric identification. The user specific data may include attribute data and state data.

The set 530 of logics may also include a fourth logic 538 that is configured to selectively control an operation of the apparatus as a function of the biometric identification. In one embodiment, the operation may be intended to launch an application from the shared launch surface using the user specific data. For example, while a game is in progress, a gamer may want to view a recently released video. The gamer may start a video watching app in a small window on their display without disrupting other gamers. The video watching app might cost the gamer some money or might count against the gamer's data plan. Thus, launching the video watching app using the gamer's context may allow this direct billing. In another embodiment, the operation may be intended to be performed in an application launched from the shared launch surface. In this case, the operation may be controlled, at least in part, by the user specific data.

In different embodiments, some processing may be performed on the apparatus 500 and some processing may be performed by an external service or apparatus. Thus, in one embodiment, apparatus 500 may also include a communication circuit that is configured to communicate with an external source to facilitate accessing or processing action data, user data, biometric identity data, or other data associated with attributing a user action. In one embodiment, the set 530 of logics may interact with a presentation service 560 to facilitate displaying data using different presentations for different devices.

Figure 6:
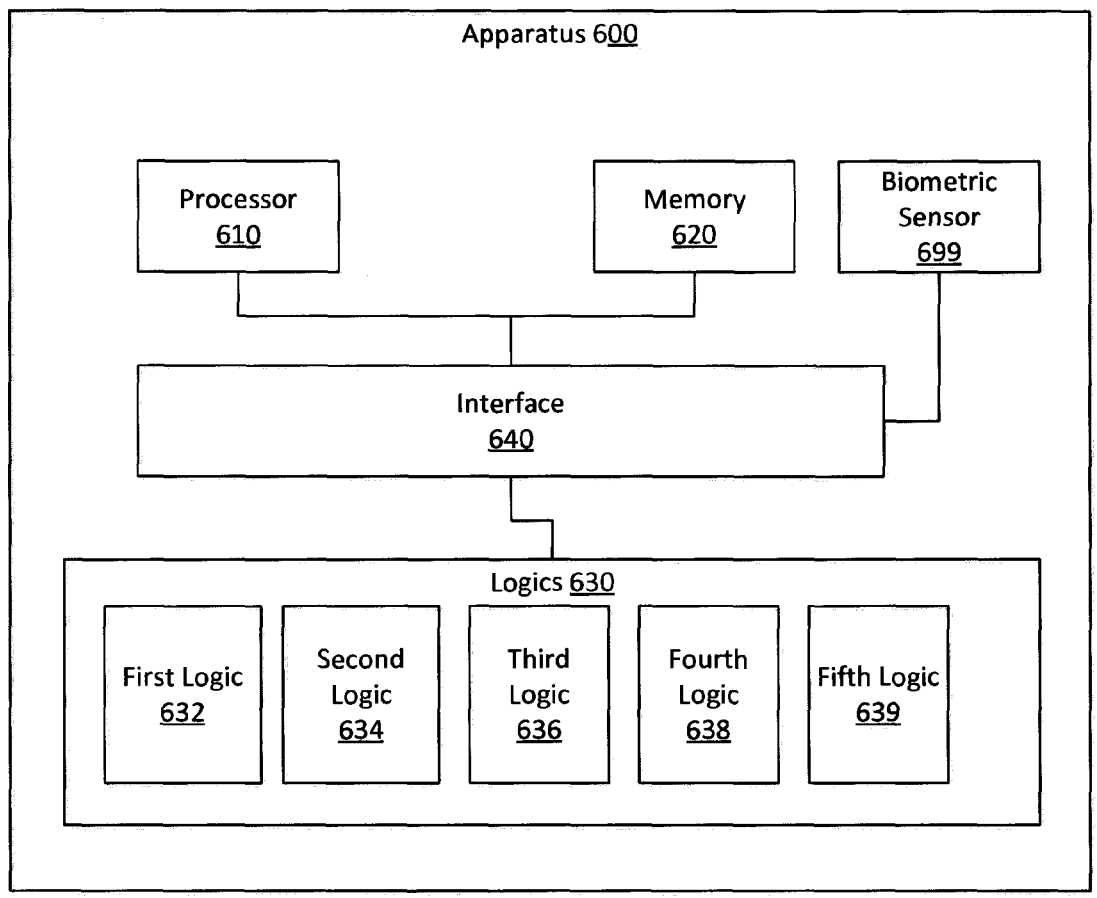
FIG. 6 illustrates an example apparatus configured to facilitate attributing a user action based on a biometric identity.

FIG. 6 illustrates an apparatus 600 that is similar to apparatus 500 (FIG. 5). For example, apparatus 600 includes a processor 610, a memory 620, a set of logics 630 (e.g., 632, 634, 636, 638) that correspond to the set of logics 530 (FIG. 5), a biometric sensor 699, and an interface 640. However, apparatus 600 includes an additional fifth logic 639. The fifth logic 639 may be configured to control ownership of the shared launch surface. The ownership may be controlled as a function of the action and the set of user specific data. For example, a first action may not require surface ownership to be changed while a second action may require surface ownership to change. When surface ownership needs to be changed, the change may be from a current owner to a subsequent owner that is identified by the context. Additionally, attributes of the launch surface may depend on the context. For example, the set of operations that can be performed by the launch surface may be limited or expanded based on the context. In one embodiment, controlling ownership involves manipulating (e.g., reading, writing, updating) the information stored in the memory 620.

Figure 7:
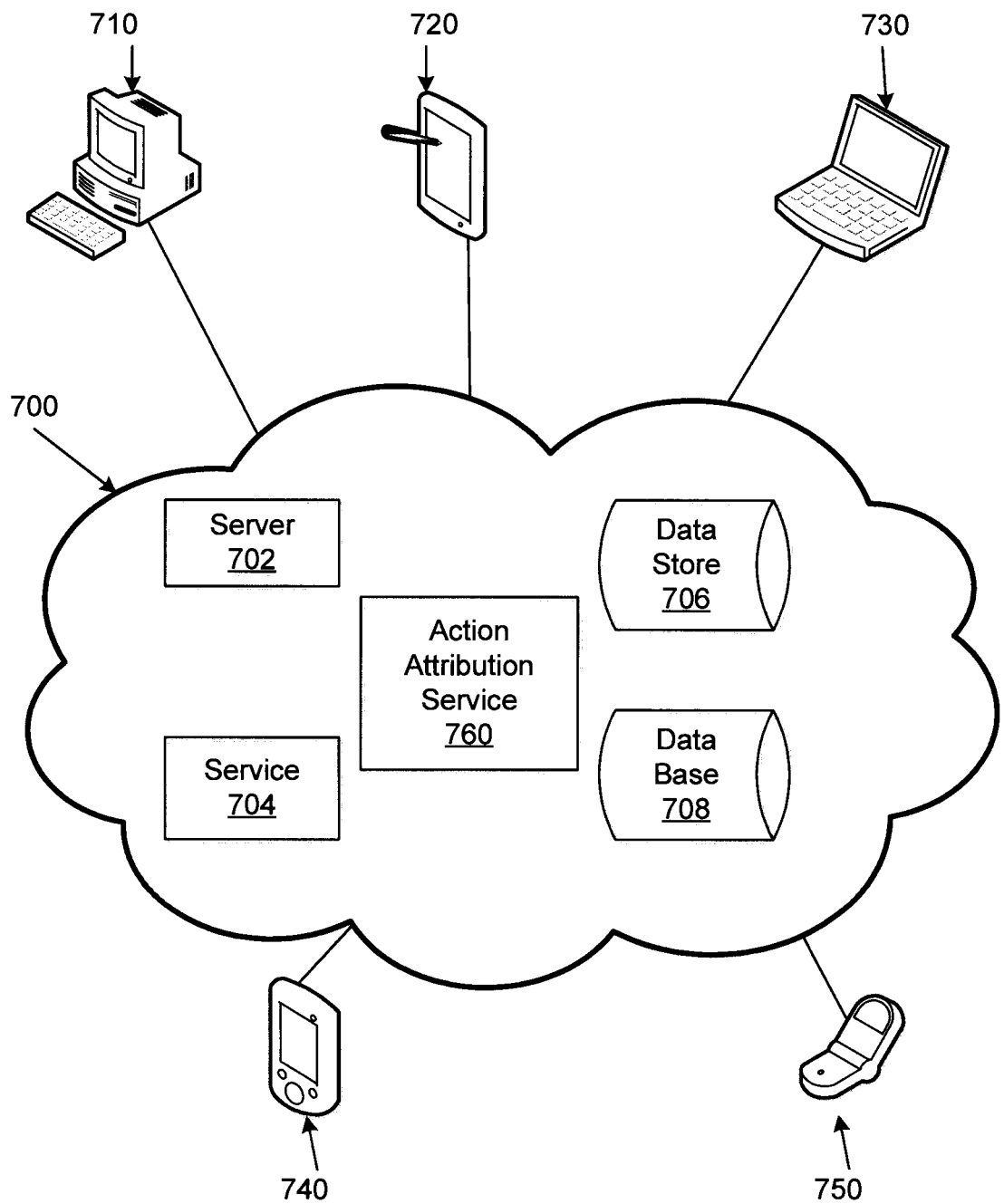
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example action attribution service 760 residing in the cloud. The action attribution service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the action attribution service 760.

FIG. 7 illustrates various devices accessing the action attribution service 760 in the cloud. The devices include a computer 710, a tablet 720, a laptop computer 730, a personal digital assistant 740, and a mobile device (e.g., cellular phone, satellite phone, wearable computing device) 750. The action attribution service 760 may store, access, or process action data, user data, biometric data, mapping data, or other data associated with connecting a user action to a context and controlling an operation (e.g., application launch, application operation) based on the action, context, and mapping.

It is possible that different users at different locations using different devices may access the action attribution service 760 through different networks or interfaces. In one example, the action attribution service 760 may be accessed by a mobile device 750. In another example, portions of action attribution service 760 may reside on a mobile device 750. In one example, action attribution service 760 may dynamically, on a per-action basis, map a real-time biometric identity with a detected action in a video game environment. This may allow flexibility (e.g., switching controllers, switching interaction approach) that is not present in conventional systems.

Figure 8:
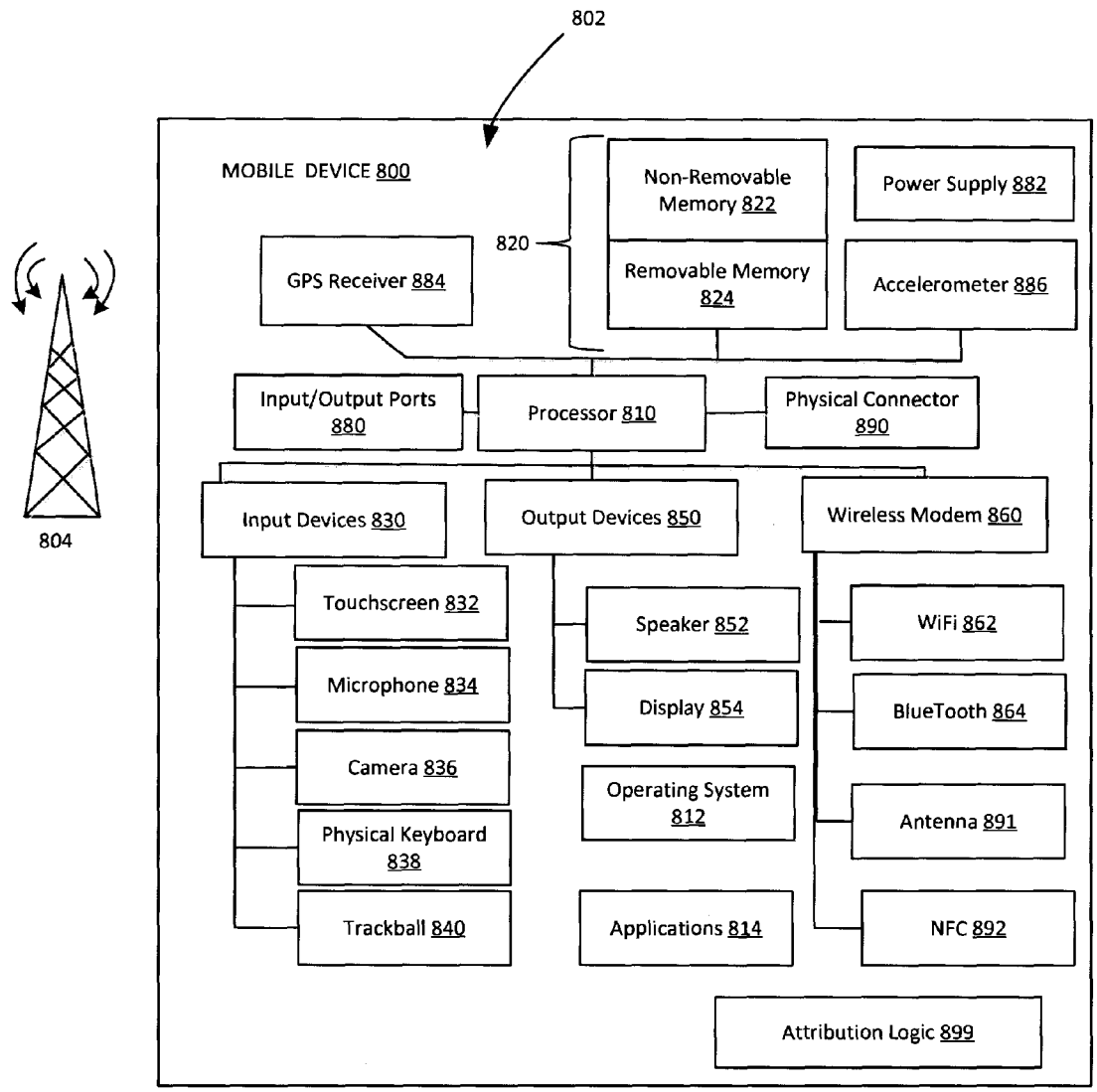
FIG. 8 is a system diagram depicting an exemplary mobile communication device configured to facilitate attributing a user action based on a biometric identity.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include gaming applications, mobile computing applications (e.g., email applications, calendars, contact managers, web browsers, messaging applications), or other computing applications. In different embodiments, mobile device 800 may function as a game console or game controller.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Near field communication (NFC) element 892 facilitates having near field communications.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include an attribution logic 899 that is configured to provide a functionality for the mobile device 800. For example, attribution logic 899 may provide a client for interacting with a service (e.g., service 760, FIG. 7). Portions of the example methods described herein may be performed by attribution logic 899. Similarly, attribution logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed in a computing device, comprising:
   detecting an action intended to control an application running on the computing the device, the application being associated with a shared launch surface, where the shared launch surface is provided by the computing device or an operating system running on the computing device, and where the shared launch surface controls launching of applications for the computing device;
   associating the action with a body located in a field of view of a biometric sensor associated with a shared launch surface;
   determining, in the computing device, using data provided by the biometric sensor, a biometric identity for the body;
   attributing the action to a user as a function of the biometric identity, where data associated with the user is stored in a data store in the computing device;
   identifying a context associated with the user, where data associated with the context is stored in a data store in the computing device, and selectively controlling how the application runs on the computing device or how the shared launch surface operates on the computing device as a function of the action and the context without navigating to the shared launch surface and without exiting an application already running on the computing device;
   where detecting the action comprises detecting a button press, detecting a virtual button press, detecting an interaction with a user interface, detecting an interaction with a game controller, detecting a manipulation of a game controller, detecting a voice command, detecting an eye movement, detecting a brain wave, or detecting a gesture,
   where the action launches an application from the shared launch surface and where selectively controlling the application or the shared launch surface comprises controlling the computing device to automatically launch the application from the shared launch surface using the context.

2. The method of claim 1, the computing device being a game console, the application being a video game and the shared launch surface being associated with a video game console.

3. The method of claim 1, where the action causes an operation in an application available through the shared launch surface and where selectively controlling the application or the shared launch surface comprises controlling the computing device to associate the context with the application and then selectively controlling the computing device to cause or prevent the operation from occurring.

4. The method of claim 1, the shared launch surface being associated with a multi-user operating system running on laptop computer, a tablet computer, or a phone.

5. The method of claim 1, where associating the action with the body comprises:
identifying the action as a voice command;
identifying a location from which the voice command originated;
identifying a body corresponding to the location, and
mapping the body corresponding to the location to the voice command.

6. The method of claim 1, where associating the action with the body comprises:
identifying a game controller on which the action was performed;
identifying a location at which the game controller was located;
identifying a body corresponding to the location, and
mapping the body corresponding to the location to the action.

7. The method of claim 1, where associating the action with the body comprises:
identifying the action as a gesture; and
identifying a body that made the gesture.

8. The method of claim 1, where determining the biometric identity includes performing, in real-time, on a per-act basis, facial recognition, gesture recognition, voice recognition, fingerprint recognition, haptic recognition, breathing pattern recognition, apparel recognition, height recognition, ear shape recognition, or retinal recognition.

9. The method of claim 1, the context comprising an attribute and a state, the attribute being a user name, a screen name, a data plan identifier, a billing identifier, an account identifier, a parental control setting, a display preference, or a social media data, and the state being a location, a data plan balance, a billing balance, an account balance, an experience level, an access time, a engaged time, a location, a user language, a saved game, a saved file, a purchased content, or a connectivity level.

10. The method of claim 1, where selectively controlling the application or the shared launch surface comprises controlling the computing device to launch a second application using the context while preserving a first context associated with a first application running on the shared launch surface and without halting the first application.

11. The method of claim 1, where selectively controlling the application or the shared launch surface comprises controlling the computing device to selectively deny control of the application in response to the action based on the context or to selectively deny launching an application based on the context.

12. A computer-readable storage medium storing computer-executable instructions that when executed by a computer control the computer to perform a method, the method comprising:
detecting an action intended to control an application associated with a shared launch surface, the application being a video game, the shared launch surface being associated with a video game console on which the video game is running, the action being a button press, a virtual button press, an interaction with a user interface, an interaction with a game controller, a manipulation of a game controller, a voice command, or a gesture;
associating the action with a body located in a field of view of a biometric sensor associated with the shared launch surface,
where associating the action with the body comprises:
identifying the action as a voice command, a gesture, or a controller action;
identifying a location from which the voice command originated, from which the gesture originated, or at which the controller action was performed;
identifying a body corresponding to the location, and
mapping the body corresponding to the location;
determining, on a per-act basis, using data provided by the biometric sensor, a biometric identity for the body, where the biometric identity is determined by performing facial recognition, gesture recognition, voice recognition, fingerprint recognition, haptic recognition, or retinal recognition;
attributing the action to a user as a function of the biometric identity;
identifying a context associated with the user, where the context includes attribute data and state data, and
selectively controlling the application or the shared launch surface as a function of the action and the context,
where selectively controlling the application or the shared launch surface comprises controlling the computing device to launch a second application using the context while preserving a first context associated with a first application running on the shared launch surface and without halting the first application.

13. An apparatus, comprising:
a processor;
a memory configured to store information concerning ownership of a shared launch surface running on the apparatus, where the shared launch surface is provided by the apparatus or an operating system running on the apparatus, and where the shared launch surface controls launching of an application for the apparatus, and where the application has a context associated with a user;
a biometric sensor;
a set of logics configured to attribute a user action as a function of a biometric identity; and
an interface to connect the processor, the memory, the biometric sensor, and the set of logics;
the set of logics comprising:
a first logic that tracks one or more bodies located in a field of detection of the biometric sensor using data provided by the biometric sensor;
a second logic that identifies an action performed by a member of the one or more bodies;
a third logic that produces a biometric identification of the member using data provided by the biometric sensor, where the biometric identification is performed in response to the action, and where the third logic maintains a mapping between the member and the biometric identity, where the third logic maps the action to the member at the time of the action; and
a fourth logic that selectively controls an operation of the apparatus as a function of the biometric identification, where selectively controlling the operation of the apparatus includes controlling the apparatus to launch a second application using the context while preserving a first context associated with a first application running on the shared launch surface and without halting the first application.

14. The apparatus of claim 13, the mapping being-a four way mapping that relates a context, a controller, the user, and the application.

15. The apparatus of claim 14, the second logic being configured to identify a controller action, a voice command, and a gesture.

16. The apparatus of claim 15, the biometric sensor being an infrared (IR) sensor, a vision system, a haptic system, a sound system, or a voice system, and the third logic being configured to acquire a set of user specific data associated with the biometric identification, the user specific data comprising attribute data and state data.

17. The apparatus of claim 16, the operation being launching an application from the shared launch surface using the user specific data.

18. The apparatus of claim 14, comprising a fifth logic configured to control ownership of the shared launch surface as a function of the action and the set of user specific data, where controlling ownership comprises manipulating the information stored in the memory.

19. A method performed in a computing device, comprising:
   detecting an action intended to control an application running on the computing the device, the application being associated with a shared launch surface, where the shared launch surface is provided by the computing device or an operating system running on the computing device, and where the shared launch surface controls launching of applications for the computing device;
   associating the action with a body located in a field of view of a biometric sensor associated with a shared launch surface;
   determining, in the computing device, using data provided by the biometric sensor, a biometric identity for the body;
   attributing the action to a user as a function of the biometric identity, where data associated with the user is stored in a data store in the computing device;
   identifying a context associated with the user, where data associated with the context is stored in a data store in the computing device, and
   selectively controlling how the application runs on the computing device or how the shared launch surface operates on the computing device as a function of the action and the context without navigating to the shared launch surface and without exiting an application already running on the computing device,
   where selectively controlling the application or the shared launch surface comprises controlling the computing device to launch a second application using the context while preserving a first context associated with a first application running on the shared launch surface and without halting the first application.

20. A method performed in a computing device, comprising:
   detecting an action intended to control an application running on the computing the device, the application being associated with a shared launch surface, where the shared launch surface is provided by the computing device or an operating system running on the computing device, and where the shared launch surface controls launching of applications for the computing device;
   associating the action with a body located in a field of view of a biometric sensor associated with a shared launch surface;
   determining, in the computing device, using data provided by the biometric sensor, a biometric identity for the body;
   attributing the action to a user as a function of the biometric identity, where data associated with the user is stored in a data store in the computing device;
   identifying a context associated with the user, where data associated with the context is stored in a data store in the computing device, and
   selectively controlling how the application runs on the computing device or how the shared launch surface operates on the computing device as a function of the action and the context without navigating to the shared launch surface and without exiting an application already running on the computing device,
   where selectively controlling the application or the shared launch surface comprises controlling the computing device to selectively deny control of the application in response to the action based on the context or to selectively deny launching an application based on the context.

* * * * *